(12) United States Patent
Botimer et al.

(10) Patent No.: US 12,436,884 B2
(45) Date of Patent: Oct. 7, 2025

(54) MEMORY PROCESSING UNIT CORE ARCHITECTURES

(71) Applicant: MemryX Incorporated, Ann Arbor, MI (US)

(72) Inventors: Jacob Botimer, Ann Arbor, MI (US); Mohammed Zidan, Ann Arbor, MI (US); Timothy Wesley, Ann Arbor, MI (US); Chester Liu, Ann Arbor, MI (US); Wei Lu, Ann Arbor, MI (US)

(73) Assignee: MemryX Incorporated, Ann Arbor, MI (US)

( * ) Notice: Subject to any disclaimer, the term of this patent is extended or adjusted under 35 U.S.C. 154(b) by 23 days.

(21) Appl. No.: 17/943,116

(22) Filed: Sep. 12, 2022

(65) Prior Publication Data

US 2023/0073012 A1   Mar. 9, 2023

Related U.S. Application Data

(63) Continuation of application No. PCT/US2021/048466, filed on Aug. 31, 2021.
(Continued)

(51) Int. Cl.
| | |
|---|---|
| *G06F 12/02* | (2006.01) |
| *G06F 3/06* | (2006.01) |
| *G06F 9/46* | (2006.01) |
| *G06F 12/06* | (2006.01) |
| *G06F 12/12* | (2016.01) |
| *G06N 3/045* | (2023.01) |
| *G06N 3/063* | (2023.01) |
| *G11C 11/54* | (2006.01) |

(52) U.S. Cl.
CPC ........ *G06F 12/0607* (2013.01); *G06F 3/0611* (2013.01); *G06F 3/0659* (2013.01); *G06F 3/0673* (2013.01); *G06F 9/46* (2013.01); *G06F 12/0238* (2013.01); *G06N 3/045* (2023.01); *G06N 3/063* (2013.01); *G11C 11/54* (2013.01)

(58) Field of Classification Search
CPC .. G06F 12/0238; G06F 12/0607; G06F 17/16; G06F 3/0611; G06F 3/0659; G06F 3/0673; G06F 9/46
See application file for complete search history.

(56) References Cited

U.S. PATENT DOCUMENTS

| | | | |
|---|---|---|---|
| 2023/0259282 A1* | 8/2023 | Zidan | G06F 3/0673 |
| 2023/0273729 A1* | 8/2023 | Zidan | G06F 12/0207 |
| 2023/0305807 A1* | 9/2023 | Zidan | G06F 17/16 |

* cited by examiner

*Primary Examiner* — Yong J Choe

(57) ABSTRACT

A memory processing unit (MPU) can include a first memory, a second memory, a plurality of processing regions and control logic. The first memory can include a plurality of regions. The plurality of processing regions can be interleaved between the plurality of regions of the first memory. The processing regions can include a plurality of compute cores. The second memory can be coupled to the plurality of processing regions. The control logic can configure data flow between compute cores of one or more of the processing regions and corresponding adjacent regions of the first memory. The control logic can also configure data flow between the second memory and the compute cores of one or more of the processing regions. The control logic can also configure data flow between compute cores within one or more respective ones of the processing regions. The control logic can also configure array data for storage memory of the MPU.

6 Claims, 17 Drawing Sheets

Related U.S. Application Data

(60) Provisional application No. 63/072,904, filed on Aug. 31, 2020.

MEMORY PROCESSING UNIT CORE ARCHITECTURES

CROSS-REFERENCE TO RELATED APPLICATIONS

This application is a continuation of PCT Patent Application No. PCT/US2021/048466 filed Aug. 31, 2021, and claims the benefit of U.S. Provisional Patent Application No. 63/072,904 filed Aug. 31, 2020, which are incorporated herein in their entirety.

BACKGROUND OF THE INVENTION

Computing systems have made significant contributions toward the advancement of modern society and are utilized in a number of applications to achieve advantageous results. Applications such as artificial intelligence, machine learning, big data analytics and the like perform computations on large amounts of data. In conventional computing systems, data is transferred from memory to one or more processing units, the processing units perform calculations on the data, and the results are then transferred back to memory. The transfer of large amounts of data from memory to the processing unit and back to memory takes time and consumes power. Accordingly, there is a continuing need for improved computing systems that reduce processing latency, data latency and or power consumption.

SUMMARY OF THE INVENTION

The present technology may best be understood by referring to the following description and accompanying drawings that are used to illustrate embodiments of the present technology directed toward memory processing architectures.

In one embodiment, a memory processing unit (MPU) can include a first memory and a plurality of processing regions. The first memory can include a plurality of regions. The plurality of processing regions can be interleaved between the plurality of regions of the first memory. One or more of the plurality of processing regions can include a plurality of compute cores including one or more input/output (I/O) cores and a plurality of near memory (M) compute cores. The one or more input/output (I/O) cores can be configured to access input and output ports of the MPU. The plurality of near memory (M) compute cores can be configured to compute neural network functions. The one or more compute cores can further include one or more arithmetic (A) compute cores configured to compute arithmetic operations.

In another embodiment, a MPU can include a first memory, a plurality of processing regions and a second memory. The first memory can include a plurality of regions. The plurality of processing regions can be interleaved between the plurality of regions of the first memory. The processing regions can include one or more input/output (I/O) cores, a plurality of near memory (M) compute cores and optionally one or more arithmetic (A) compute cores. The second memory can include a plurality of memory macros. The organization and storage of a weight array in a given one of the plurality of memory macros can include quantizing the weight array, unrolling each filter of the quantized array and appending bias and exponent entries, reshaping the unrolled and appended filters to fit into corresponding physical channels, rotating the reshaped filters, and loading the virtual channels of the reshaped filters into physical channels of the given one of the memory macros.

In another embodiment, a method of fitting an array in a memory of a MPU can include quantizing the array. Each filter of the quantized array can be unrolled and bias and exponent entries can be appended. The unrolled and appended filters can be reshaped to fit into corresponding physical channels. The reshaped filter can be rotated and loaded into physical channels of the memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
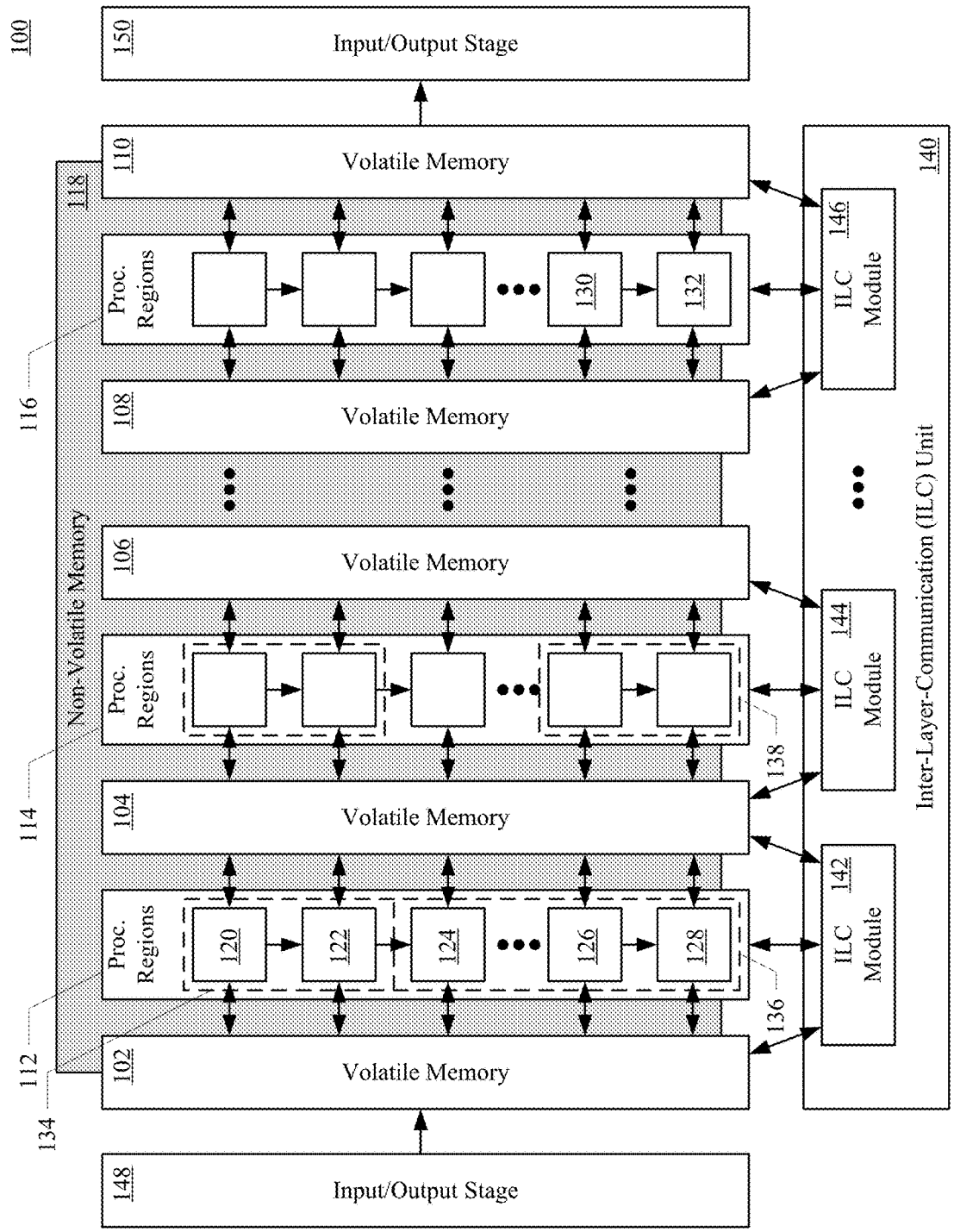
FIG. 1 shows a memory processing unit (MPU), in accordance with aspects of the present technology.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Referring to FIG. 1, a memory processing unit (MPU), in accordance with aspects of the present technology, is shown. The memory processing unit 100 can include a first memory including a plurality of regions 102-110, a plurality of processing regions 112-116 and a second memory 118. The second memory 118 can be coupled to the plurality of processing regions 112-116. The second memory 118 can optionally be logically or physically organized into a plurality of regions. The plurality of regions of the second memory 118 can be associated with corresponding ones of the plurality of processing region 112-116. In addition, the plurality of regions of the second memory 118 can include a plurality of blocks organized in one or more macros. The first memory 102-110 can be volatile memory, such as static random-access memory (SRAM) or the like. The second memory can be non-volatile memory, such as resistive random-access memory (RRAM), magnetic random-access memory (MRAM), flash memory (FLASH) or the like. The second memory can alternatively be volatile memory. In one implementation, the first memory 102-110 can be data memory, feature memory or the like, and the second memory 118 can be weight memory. Generally, the second memory can be high density, local and wide read memory.

The plurality of processing regions 112-116 can be interleaved between the plurality of regions of the first memory 102-110. The processing regions 112-116 can include a plurality of compute cores 120-132. The plurality of compute cores 120-132 of respective ones of the plurality of processing regions 112-116 can be coupled between adjacent ones of the plurality of regions of the first memory 102-110. For example, the compute cores 120-128 of a first processing region 112 can be coupled between a first region 102 and a second region 104 of the first memory 102-110. The compute cores 120-132 in each respective processing region 112-116 can be configurable in one or more clusters 134-138. For example, a first set of compute cores 120, 122 in a first processing region 112 can be configurable in a first cluster 134. Similarly, a second set of compute cores 124-128 in the first processing region can be configurable in a second cluster 136. The plurality of compute cores 120-132 of respective ones of the plurality of processing regions 112-116 can also be configurably couplable in series. For example, a set of compute cores 120-124 in a first processing region 112 can be communicatively coupled in series, wherein a second compute core 122 receiving data and or instructions from a first compute core 120, and a third compute core 124 receiving data and or instructions from the second compute core 122.

The memory processing unit 100 can further include an inter-layer-communication (ILC) unit 140. The ILC unit 140 can be global or distributed across the plurality of processing regions 112-116. In one implementation, the ILC unit 140 can include a plurality of ILC modules 142-146, wherein each ILC module can be coupled to a respective processing regions 112-116. Each ILC module can also be coupled to the respective regions of the first memory 102-110 adjacent the corresponding respective processing regions 112-116. The inter-layer-communication unit 140 can be configured to synchronize data movement between one or more compute cores producing given data and one or more other compute cores consuming the given data.

The memory processing unit 100 can further include one or more input/output stages 148, 150. The one or more input/output stages 148, 150 can be coupled to one or more respective regions of the first memory 102-110. The one or more input/output stages 148, 150 can include one or more input ports, one or more output ports, and or one or more input/output ports. The one or more input/output stages 148, 150 can be configured to stream data into or out of the memory processing unit 100. For example, one or more of the input/output (I/O) cores can be configured to stream data into a first one of the plurality of regions of the first memory 102-110. Similarly, one or more input/output (I/O) cores can be configured to stream data out of a last one of the plurality of regions of the first memory 102-110.

The plurality of processing regions 112-116 can be configurable for memory-to-core dataflow from respective ones of the plurality of regions of the first memory 102-110 to one or more cores 120-132 within adjacent ones of the plurality of processing regions 112-116. The plurality of processing regions 112-116 can also be configurable for core-to-memory dataflow from one or more cores 120-132 within ones of the plurality of processing regions 112-116 to adjacent ones of the plurality of regions of the first memory 102-110. In one implementation, the dataflow can be configured for a given direction from given ones of the plurality of regions of the first memory 102-110 through respective ones of the plurality of processing regions to adjacent ones of the plurality of regions of the first memory 102-110.

The plurality of processing regions 112-116 can also be configurable for memory-to-core data flow from the second memory 118 to one or more cores 120-132 of corresponding ones of the plurality of processing regions 112-116. If the second memory 118 is logically or physically organized in a plurality of regions, respective ones of the plurality of regions of the second memory 118 can be configurably couplable to one or more compute cores in respective ones of the plurality of processing regions 112-116.

The plurality of processing regions 112-116 can be further configurable for core-to-core data flow between select adjacent compute cores 120-132 in respective ones of the plurality of processing regions 112-116. For example, a given core 124 can be configured to pass data accessed from an adjacent portion of the first memory 102 with one or more other cores 126-128 configurably coupled in series with the given compute core 124. In another example, a given core 120 can be configured to pass data accessed from the second memory 118 with one or more other cores 122 configurably coupled in series with the given compute core 120. In yet another example, a given compute core 120 can pass a result, such as a partial sum, computed by the given compute core 120, to one or more other cores 122 configurably coupled in series with the given compute core 120.

The plurality of processing regions 112-116 can include one or more near memory (M) compute cores. The one or more near memory (M) compute cores can be configurable to compute neural network functions. For example, the one or more near memory (M) compute cores can be configured to compute vector-vector products, vector-matrix products, matrix-matrix products, and the like, and or partial products thereof.

The plurality of processing regions 112-116 can also include one or more arithmetic (A) compute cores. The one or more arithmetic (A) compute cores can be configurable to compute arithmetic operations. For example, the arithmetic (A) compute cores can be configured to compute merge operation, arithmetic calculation that are not supported by the near memory (M) compute cores, and or the like.

The plurality of input and output regions 148, 150 can also include one or more input/output (I/O) cores. The one or more input/output (I/O) cores can be configured to access input and or output ports of the memory processing unit (MPU) 100. The term input/output (I/O) core as used herein can refer to cores configured to access input ports, cores configured to access output ports, or cores configured to access both input and output ports.

The compute cores 120-132 can include a plurality of physical channels configurable to perform computations, accesses and the like, simultaneously with other cores within respective processing regions 112-116, and or simultaneously with other cores in other processing regions 112-116. The compute cores 120-132 of respective ones of the plurality of processing regions 112-116 can be associated with one or more blocks of the second memory 118. The compute cores 120-132 of respective ones of the plurality of processing regions 112-116 can be associated with respective slices of the second plurality of memory regions. The cores 120-132 can include a plurality of configurable virtual channels.

Figure 2:
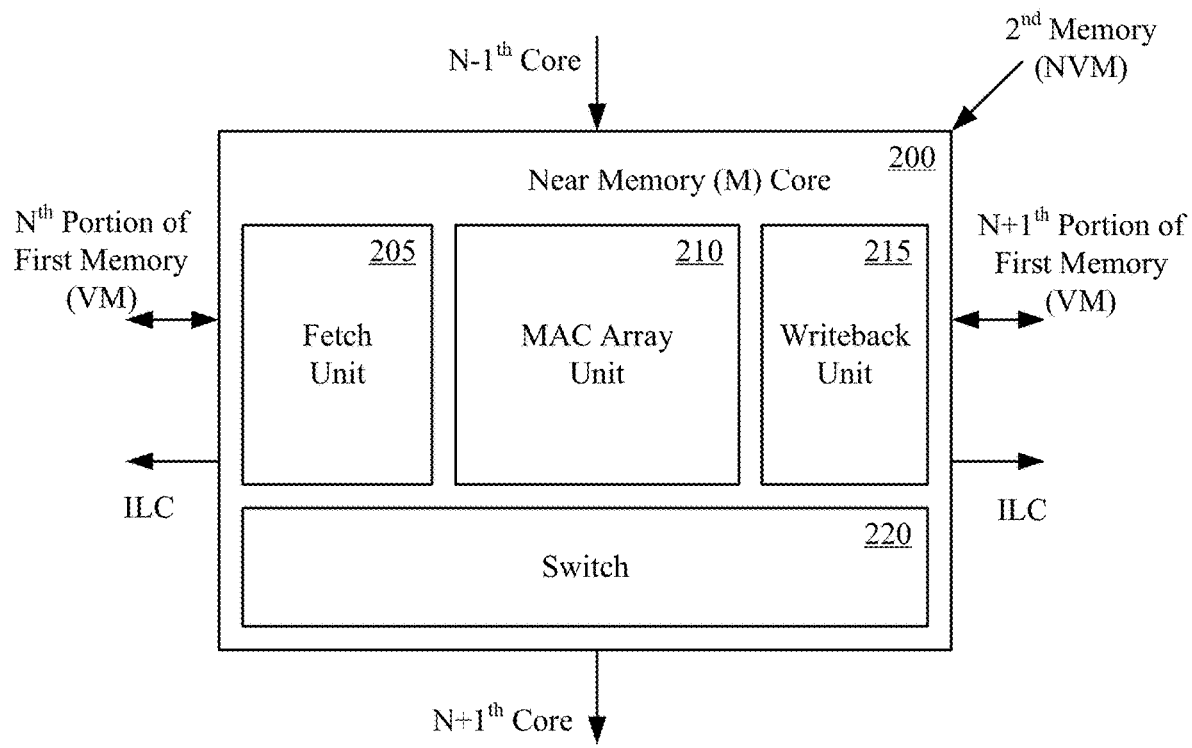
FIG. 2 shows a near memory (M) compute core, in accordance with aspects of the present technology.

Referring now to FIG. 2, a near memory (M) compute core, in accordance with aspects of the present technology, is shown. The near memory (M) compute core 200 can include a fetch unit 205, a multiply-and-accumulate (MAC) array unit 210, a writeback unit 215 and a switch 220. The fetch unit 205 can be configured to fetch data from an $N^{th}$ portion of the first memory 102-110 for the multiply-and-accumulate (MAC) array unit 210. The fetch unit 205 can also be configured to receive data from a $N-1^{th}$ compute core and or pass data to a $N+1^{th}$ compute core within a respect processing region. The fetch unit 205 can also be configured to receive data from the second memory 118. The fetch unit 205 can also be configured to synchronize data movement the $N^{th}$ portion of the first memory 102-110 with the inter-layer-communication (ILC) unit 140. In one implementation, the fetch unit 205 can be configured to control an operation sequence of the near memory (M) compute core 200, to fetch data from the second memory 118 or an adjacent one of a sequence of the plurality of compute cores in a respective processing region, to fetch data from an adjacent one of the plurality of regions of the first memory, to decrement an inter-layer-communication (ILC) counter, and to trigger other units of the near memory (M) core.

The multiply-and-accumulate (MAC) array unit 210 can be configured to compute neural network functions. For example, the multiply-and-accumulate (MAC) array unit 210 can be configured to compute vector-vector products, vector-matrix products, matrix-matrix products, and the like, and or partial products thereof. The multiply-and-accumulate (MAC) array unit 210 can also be configured to perform pre-channel and bias scaling. In one implementation, the multiply-and-accumulate (MAC) array unit 210 can be configured to perform main operations such as, but not limited to, dense or fully connected convolutions, two-dimensional convolutions, depth-wise convolutions, and separable convolutions. The multiply-and-accumulate (MAC) array unit 210 can also be configured to perform fused operations such as, but not limited to, max pooling, average pooling, rectify linear (ReLU) activation, ReLU-x activation, and up-sampling. The multiply-and-accumulate (MAC) array unit 210 can also be configured to perform virtually fused operations such as, but not limited to, zero padding (folded into kernel corners), average pooling (folded into weights and biases), ReLU activation, ReLU-x activation, and up-sampling.

The writeback unit 215 can be configured to write data to an $N+1^{th}$ portion of the first memory 102-110 for the multiply-and-accumulate (MAC) array unit 210. The writeback unit 215 can also be configured to synchronize data movement the $N^{th}$ portion of the first memory 102-110 with the inter-layer-communication (ILC) unit 140. In one implementation, the writeback unit 215 can be configured to perform a fuse operation, send data to an adjacent region of the first memory or adjacent compute core in the respective processing region, and to increment an inter-layer-communication (ILC) counter.

The switch 220 can configure memory accesses, and chain directions and interfaces of the fetch unit and writeback units to ports of the respective near memory (M) compute core based on configuration information. The switch 220 can be preconfigured with memory access and chain directions. The switch 220 can therefore interface the fetch 205 and writeback units 215 based on the data-flow configuration.

The near memory (M) compute core 200 can include a plurality of physical channels configurable to perform computations simultaneously. The near memory (M) compute core 200 can also be associated with one or more blocks of the second memory. The physical channels of the near memory (M) compute core 200 can be associated with respective slices of the second plurality of memory regions. The near memory (M) compute core 200 can also include a plurality of configurable virtual channels.

Figure 3:
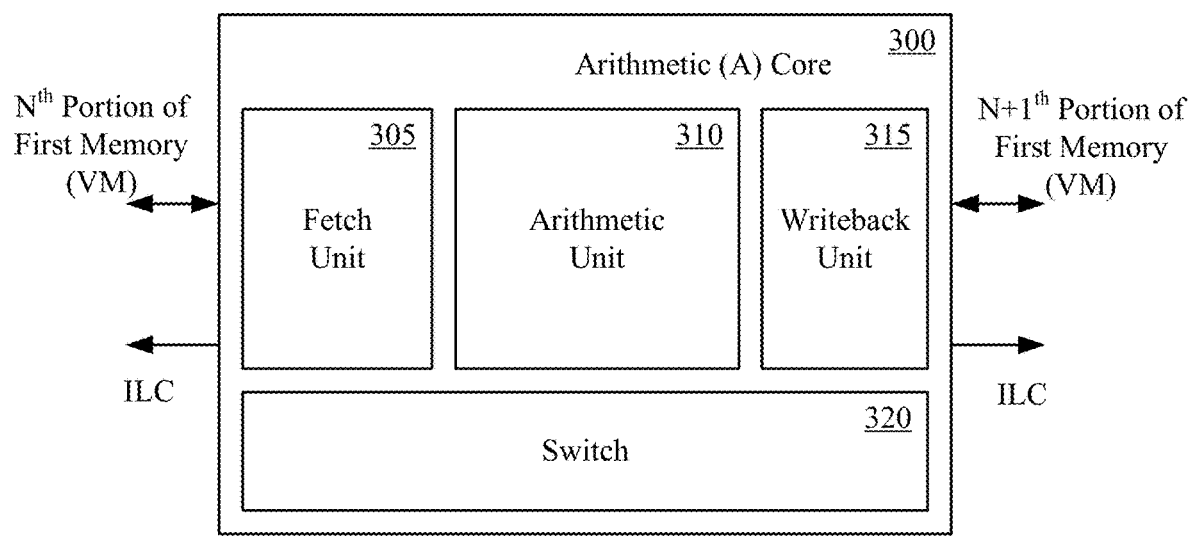
FIG. 3 shows an arithmetic (A) compute core, in accordance with aspects of the present technology.

Referring now to FIG. 3, an arithmetic (A) compute core, in accordance with aspects of the present technology, is shown. The arithmetic (A) compute core 300 can include a fetch unit 305, an arithmetic unit 310, a writeback unit 315 and a switch 320. Again, the fetch unit 305 can be configured to fetch data from an $N^{th}$ portion of the first memory 102-110 for the arithmetic unit 310. The fetch unit 305 can also be configured to synchronize data movement the $N^{th}$ portion of the first memory 102-110 with the inter-layer-communication (ILC) unit 140. In one implementation, the fetch unit 305 can be configured to control an operation sequence of the arithmetic unit 310, to fetch data from an adjacent one of the plurality of regions of the first memory, decrement an inter-layer-communication (ILC) counter, and trigger other units of the arithmetic (A) compute core 300.

The arithmetic unit 310 can be configured to compute arithmetic operations not supported by the multiply accumulate (MAC) array unit 210. For example, the arithmetic unit 310 can be configured to compute merge operations and or the like. The arithmetic unit 310 can compute one or more output channels at a time. The arithmetic unit 310 may not have access to the second memory. The arithmetic unit 310 may have no means to pass data between adjacent cores in the same processing region. In one implementation, the arithmetic unit 310 can be configured to perform main operations such as, but not limited to, add, multiply and bypass. The arithmetic unit 310 can also be configured to fuse operations such as, but not limited to, ReLU activation, ReLU-x activation, and leaky ReLU-x activation.

The writeback unit 315 can be configured to write data to an $N+1^{th}$ portion of the first memory 102-110 for the arithmetic unit 310. The writeback unit 315 can also be configured to synchronize data movement the $N^{th}$ portion of the first memory 102-110 with the inter-layer-communication (ILC) unit 140. In one implementation, the writeback unit 315 can be configured to perform a fuse operation, send data to an adjacent region of the first memory or an adjacent compute core in the respective processing region, and to increment an inter-layer-communication (ILC) counter.

Figure 4:
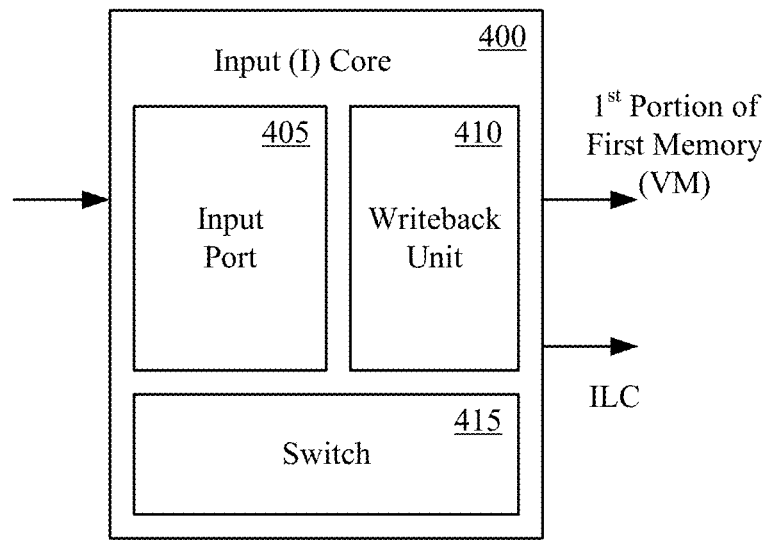
FIG. 4 shows an input (I) core, in accordance with aspects of the present technology.

The switch 320 can be configured to configure memory accesses, chain directions and interfaces of the fetch unit and writeback units to ports of the arithmetic compute core based on configuration information Referring now to FIG. 4, an input (I) core, in accordance with aspects of the present technology, is shown. The input (I) core 400 can include an input port 405, a writeback unit 410 and switch 415. The input port 405 can be configured to receive data into the memory processing unit 100 and trigger the writeback unit 410. The writeback unit 410 can be configured to stream the received data into a first portion of the first memory 102 and increment an inter-layer-communication (ILC) counter. The switch 415 can be configured to connect the writeback unit 410 to the adjacent regions of the first memory based on configuration information. In one implementation, an input stage 148 can be comprised of a single or multiple input (I) cores 400.

Figure 5:
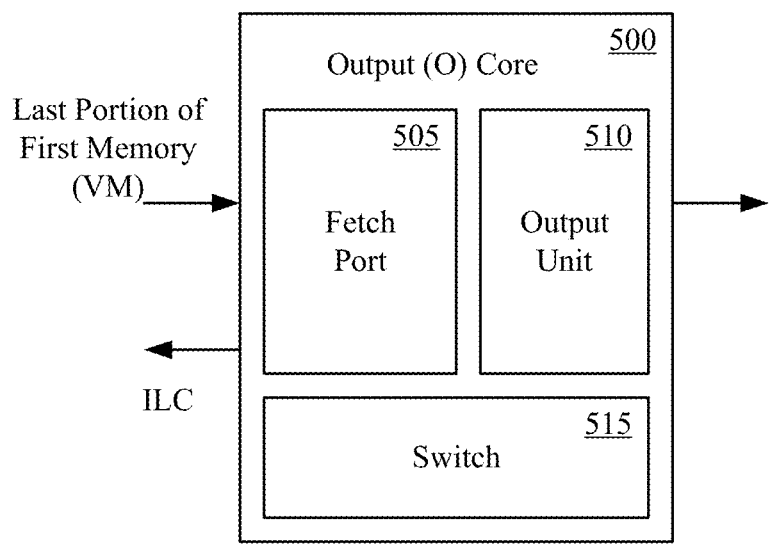
FIG. 5 shows an output (O) core, in accordance with aspects of the present technology.

Referring now to FIG. 5, an output (O) core, in accordance with aspects of the present technology, is shown. The output (O) core 500 can include a fetch port 505, an output unit 510 and a switch 515. The fetch port 505 can be configured to stream data out from a last portion of the first memory 110 and trigger the output unit 510. The output unit 510 can be configured to output data out of the memory processing unit 100. The switch 515 can be configured to connect the fetch port 505 to the adjacent regions of the first memory and the inter-layer-communication (ILC) unit based on configuration information. In one implementation, an output stage 150 can be comprised of a single or multiple output (O) cores 500.

Figure 6:
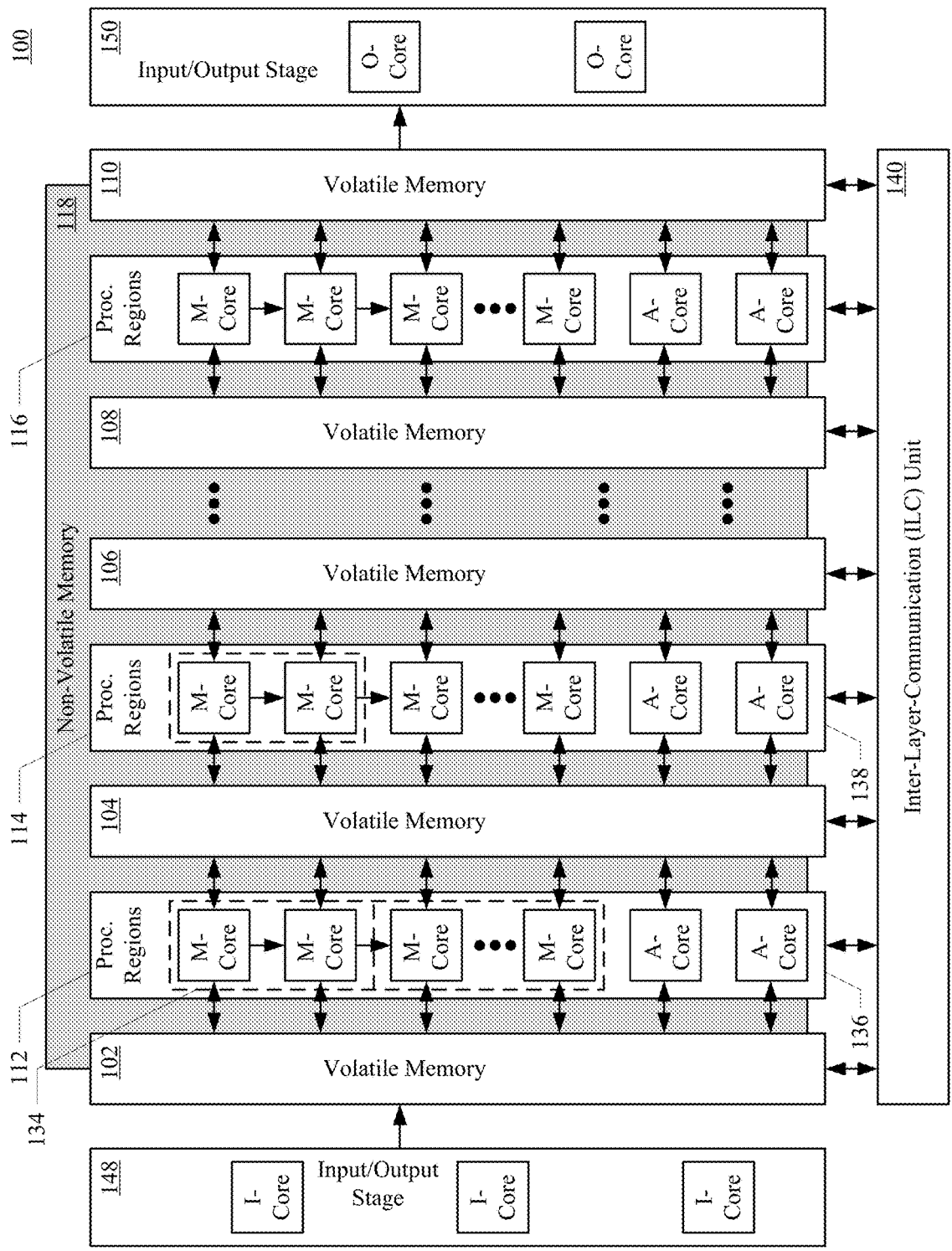
FIG. 6 shows a memory processing unit (MPU), in accordance with aspects of the present technology.

Referring now to FIG. 6, a memory processing unit (MPU), in accordance with aspects of the present technology, is shown. Again, the memory processing unit 100 can include a first memory including a plurality of regions 102-110, a plurality of processing regions 112-116 and a second memory 118. The second memory 118 can be coupled to the plurality of processing regions 112-116. The second memory 118 can optionally be logically or physically organized into a plurality of regions. The plurality of regions of the second memory 118 can be associated with corresponding ones of the plurality of processing region 112-116. In addition, the plurality of regions of the second memory 118 can include a plurality of blocks organized in one or more macros. The first memory 102-110 can be volatile memory, such as static random-access memory (SRAM) or the like. The second memory can be non-volatile memory, such as resistive random-access memory (RRAM), magnetic random-access memory (MRAM), flash memory (FLASH) or the like. The second memory can also be volatile memory. In one implementation, the first memory 102-110 can be data memory, feature memory or the like, and the second memory 118 can be weight memory. Generally, the second memory can be high density, local and wide read memory.

Again, the plurality of processing regions 112-116 can be interleaved between the plurality of regions of the first memory 102-110. The processing regions 112-116 can include a plurality of compute cores. The plurality of compute cores of respective ones of the plurality of processing regions 112-116 can be coupled between adjacent ones of the plurality of regions of the first memory 102-110. The compute cores in each respective processing region 112-116 can be configurable in one or more clusters 134-138. The plurality of compute cores of respective ones of the plurality of processing regions 112-116 can also be configurably couplable in series.

Again, the memory processing unit 100 can further include an inter-layer-communication (ILC) unit 140. The inter-layer-communication unit 140 can be coupled to the plurality of regions of the first memory 102-110. The inter-layer-communication unit 140 can be configured to synchronize data movement between one or more compute cores producing given data and one or more other compute cores consuming the given data.

The memory processing unit 100 can further include one or more input/output stages 148, 150. The one or more input/output stages 148, 150 can be coupled to one or more respective regions of the first memory 102-110. In one implementation, an input stage 148 can include one or more input (I) cores. Similarly, an output stage 150 can include one or more output (I) cores.

The plurality of processing regions 112-116 can include a plurality of near memory (M) compute cores and one or more arithmetic (A) compute cores. The one or more near memory (M) compute cores can be configurable to compute neural network functions. The one or more arithmetic (A) compute cores can be configurable to compute arithmetic operations that are not supported by the near memory (M) compute cores.

The near memory (M) compute cores and arithmetic (A) compute cores of the plurality of processing regions 112-116 can be configurable for memory-to-core dataflow from respective ones of the plurality of regions of the first memory 102-110 to one or more cores within adjacent ones of the plurality of processing regions 112-116. The near memory (M) compute cores and arithmetic (A) compute cores of the plurality of processing regions 112-116 can also be configurable for core-to-memory dataflow from one or more cores within ones of the plurality of processing regions 112-116 to adjacent ones of the plurality of regions of the first memory 102-110.

The near memory (M) compute cores of the plurality of processing regions 112-116 can also be configurable for memory-to-core data flow from the second memory 118 to one or more near memory (M) compute cores of corresponding ones of the plurality of processing regions 112-116. However, in one implementation, the arithmetic (A) compute cores may not be configurable for memory-to-core data flow from the second memory 118.

The near memory (M) compute cores of the plurality of processing regions 112-116 can be further configurable for core-to-core data flow between select adjacent compute cores 120-132 in respective ones of the plurality of processing regions 112-116. However, in one implementation, the arithmetic (A) compute cores may not be configurable for core-to-core data flow between adjacent compute cores in respective ones of the plurality of processing regions 112-116.

Figure 7:
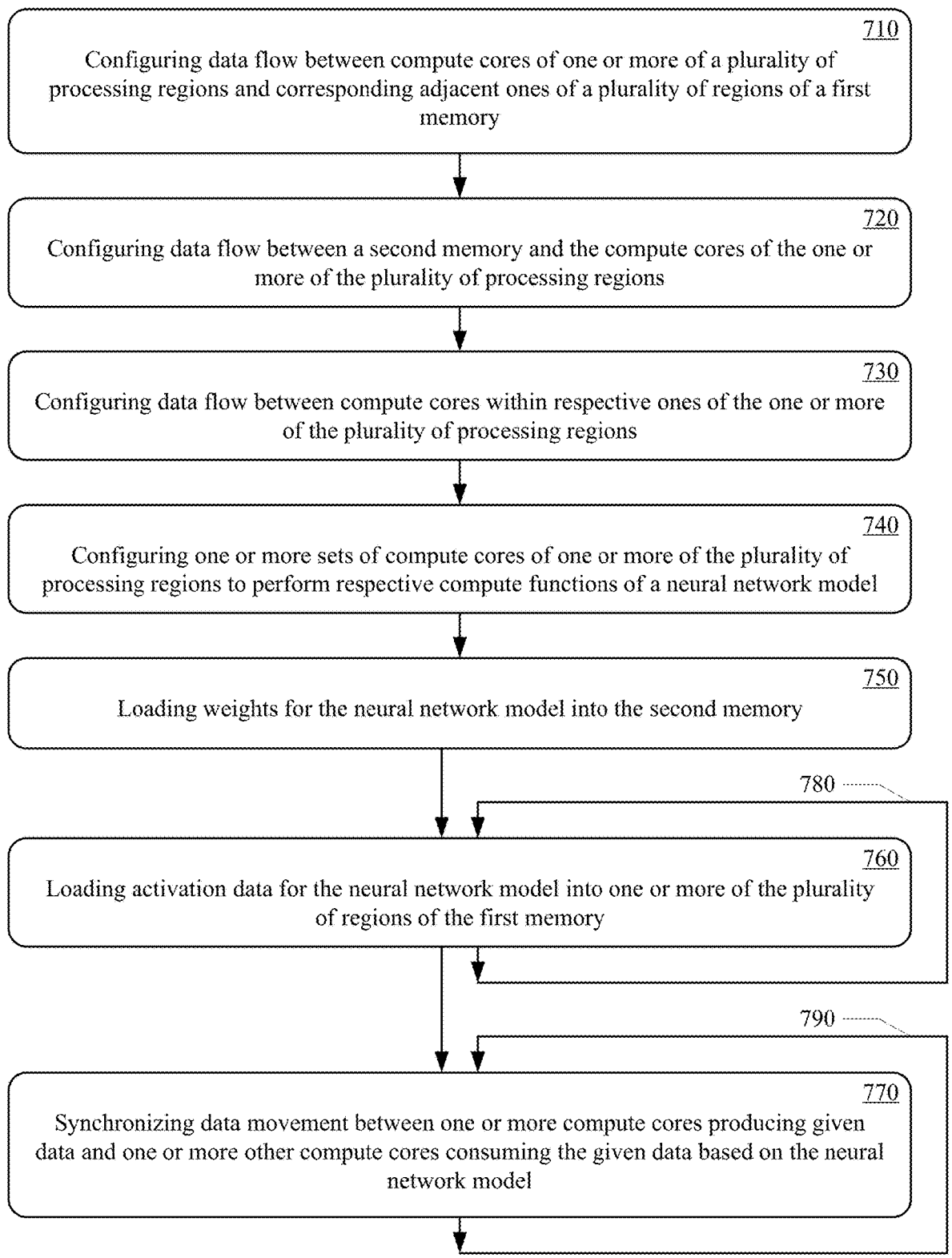
FIG. 7 shows a memory processing method, in accordance with aspects of the present technology.

Referring now to FIG. 7, a memory processing method, in accordance with aspects of the present technology, is shown. The method will be explained with reference to the memory processing unit 100 of FIG. 1. The method can include configuring data flow between compute cores of one or more of a plurality of processing regions 112-116 and corresponding adjacent ones of the plurality of regions of the first memory, at 710. At 720, data flow between the second memory 118 and the compute cores 120-132 of the one or more of the plurality of processing regions 112-116 can be configured. In one implementation, one or more near memory (M) compute cores can be configured to fetch data from the second memory 118. However, the arithmetic (a) compute cores may not have access to the second memory. At 730, data flow between compute cores 120-132 within respective ones of the one or more of the plurality of processing regions 112-116 can be configured. In one implementation, near memory (M) compute cores in respective processing regions 112-116 can be configured for core-to-core data flow between select adjacent near memory (M) compute cores. However, the arithmetic (A) compute cores may not be configurable for core-to-core data flow between adjacent compute cores in respective ones of the plurality of processing regions 112-116. Although the processes of 710-730 are illustrated as being performed in series, it is appreciated that the processes can be performed in parallel or in various combinations of parallel and sequential operations.

At 740, one or more sets of compute cores 120-132 of one or more of the plurality of processing regions 112-116 can be configured to perform respective compute functions of a neural network model. In one implementation, the near memory (M) compute cores can be configured to perform main operations such as, but not limited to, dense or fully connected convolutions, two-dimensional convolutions, depth-wise convolutions, and separable convolutions. The near memory (M) compute cores can also be configured to perform fused operations such as, but not limited to, max pooling, average pooling, ReLU activation, ReLU-x activation, and up-sampling. The near memory (M) compute cores can also be configured to perform virtually fused operations such as, but not limited to, zero padding (folded into kernel corners), average pooling (folded into weights and biases), ReLU activation, ReLU-x activation, and up-sampling. The arithmetic (A) compute cores can be configured to perform main operations such as, but not limited to, add, multiply and bypass. The arithmetic (A) compute cores can also be configured to fuse operations such as, but not limited to, ReLU activation, ReLU-x activation, and leaky ReLU-x activation. At 750, weights for the neural network model can be loaded into the second memory 118. At 760, activation data for the neural network model can be loaded into one or more of the plurality of regions of the first memory 102-110.

At 770, data movement between one or more compute cores producing given data and one or more other compute cores consuming the given data can be synchronized based on the neural network model. The synchronization process can be repeated at 780 for processing the activation data of the neural network model. The synchronization process can include synchronization of the loading of the activation data of the neural network model over a plurality of cycles, at 790.

The memory processing unit, in accordance with aspects of the present technology, can advantageously provide simple dataflow without a centralized control unit. The memory processing unit can also advantageously implement immersed in-memory computing. The memory processing unit can also advantageously reduce off-chip data communications. The memory processing unit can also advantageously increase data reuse. The memory processing unit can also be configured utilizing offline programming.

Figure 8:
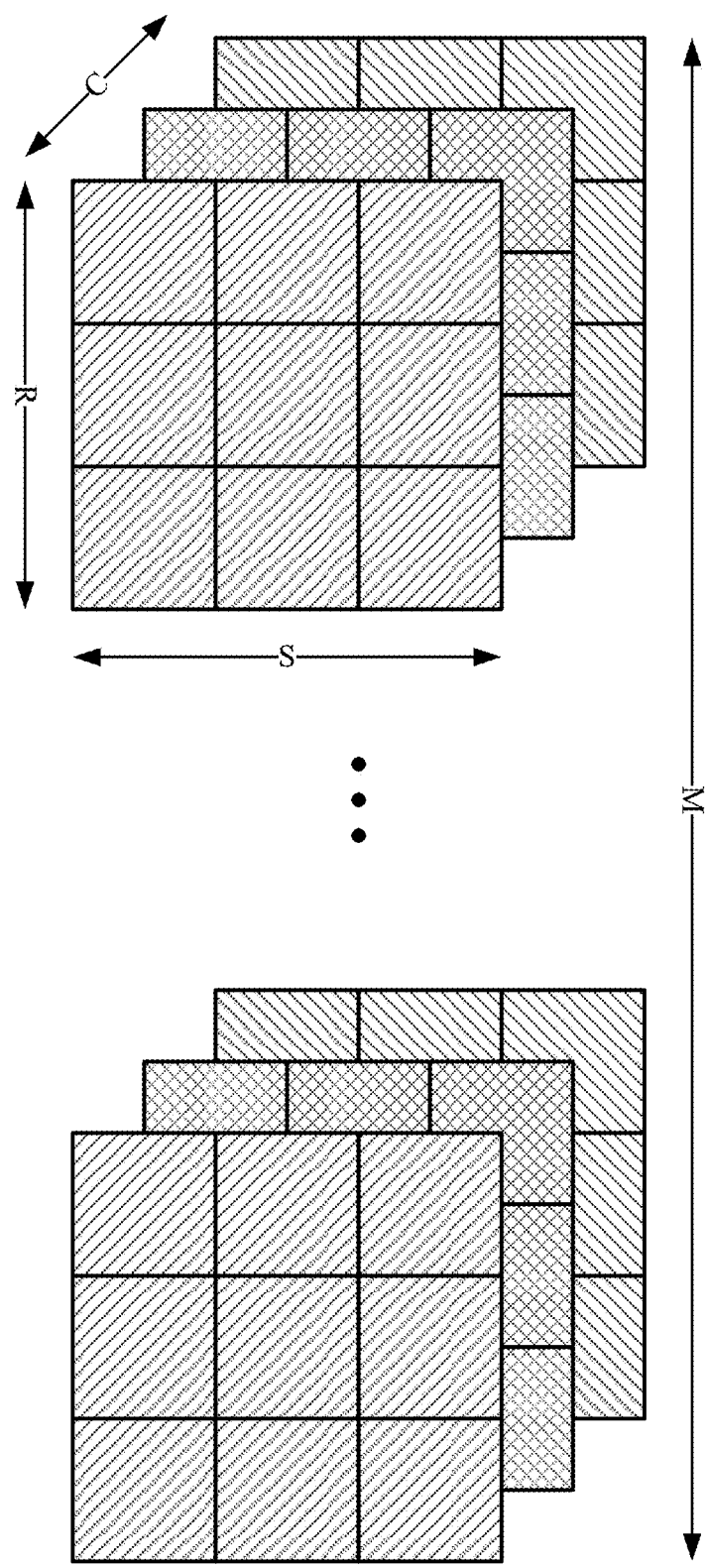
FIG. 8 illustrates a 4-dimension array, in accordance with aspects of the present technology.

Referring now to FIG. 8, a 4-dimension array, in accordance with aspects of the present technology, is illustrated. In one implementation, the 4-dimension array may be a weight array utilized in artificial intelligence computations, such as but not limited to convolution neural network computations. In one implementation, the 4-dimensional array can be utilized in 2-dimension convolution layers of a neural network model. The 4-dimension array can be characterized by a kernel width (S), a kernel height (R), input channels (C) and output channels (M) (e.g., number of kernels per layer). Accordingly, the filters (or kernels) have a dimension of R×S×C, and there are M filters.

Figure 9:
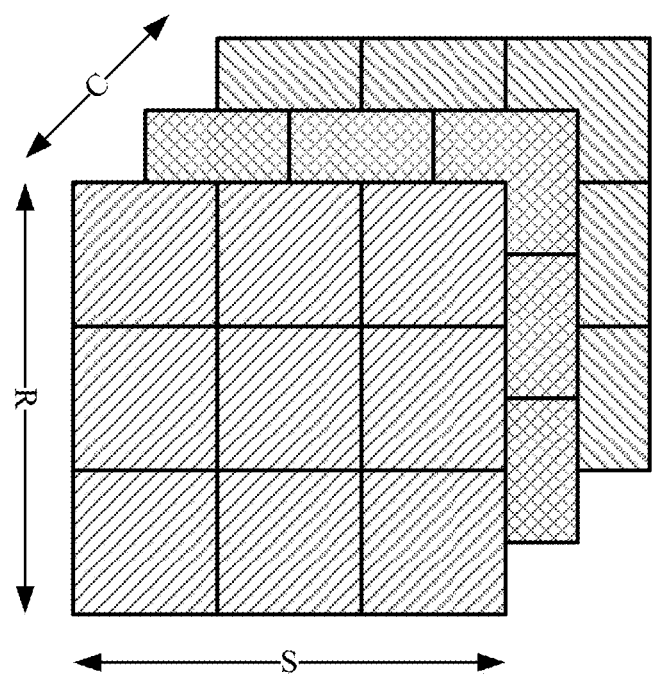
FIG. 9 illustrates a 3-dimension array, in accordance with aspects of the present technology.

Referring now to FIG. 9, a 3-dimension array, in accordance with aspects of the present technology, is illustrated. In one implementation, the 3-dimension array can be utilized in a 2-dimensional depth-wise convolution layer of a neural network model. The 3-dimensional array can be characterized by a kernel width (S), a kernel height (R) and input channels (C). Each kernel has a dimension of R×S, and acts on each input channel separately to produce an output feature map with C output channels.

Figure 10:
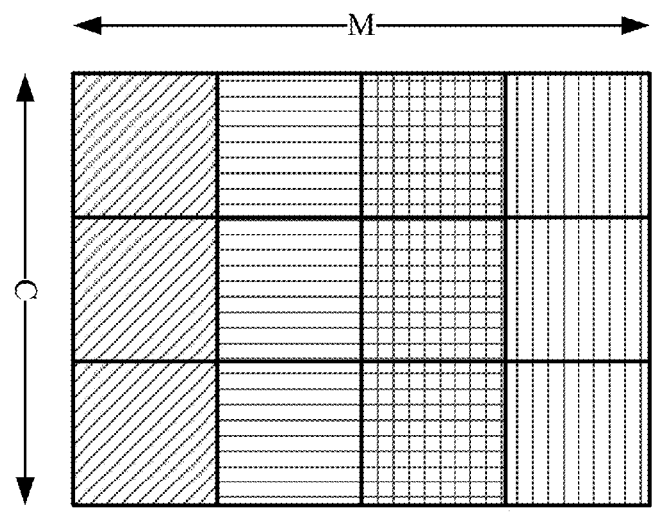
FIG. 10 illustrates a 2-dimension array, in accordance with aspects of the present technology.

Referring now to FIG. 10, a 2-dimension array, in accordance with aspects of the present technology, is shown. In one implementation, the 2-dimension array can be a dense weight array utilized in a full connected layer of a neural network model. The 2-dimension array can be characterized by flattened input channels (C) and output channels (M). The 2-dimension weight array is typically used in the end of a neural network mode for classification layers.

Figure 11:
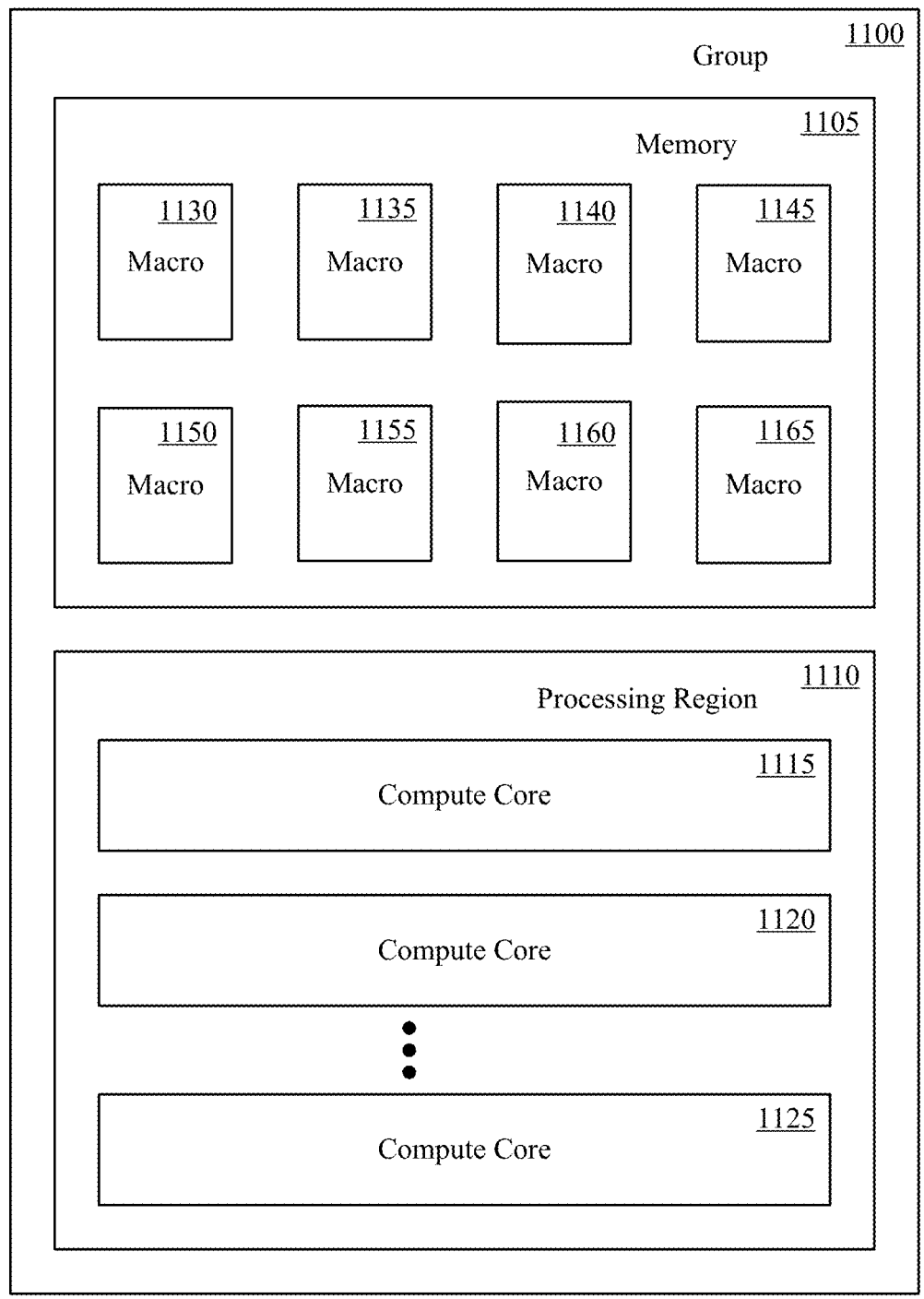
FIG. 11 shows a memory and processing group of a memory processing unit (MPU), in accordance with aspects of the present technology.

Referring now to FIG. 11, a memory and processing group of a memory processing unit (MPU), in accordance with aspects of the present technology, is shown. The group 1100 can include a memory and a processing region of a memory processing unit (MPU). In one implementation, the memory can be a second memory 118 and the processing region can be a given processing region 114 of a memory processing unit (MPU) 100 in accordance with FIG. 1. The processing region 110 can include a plurality of compute cores 1115-1125. The compute cores 1115-1125 can be configurable in one or more clusters. The compute cores 1115-1125 can be configurably couplable in series. The compute cores 1115-1125 are also coupled to the memory 1105. Data, such as weight arrays can be stored in one or more memory macros 1130-1165 in the memory 1105.

Figure 12:
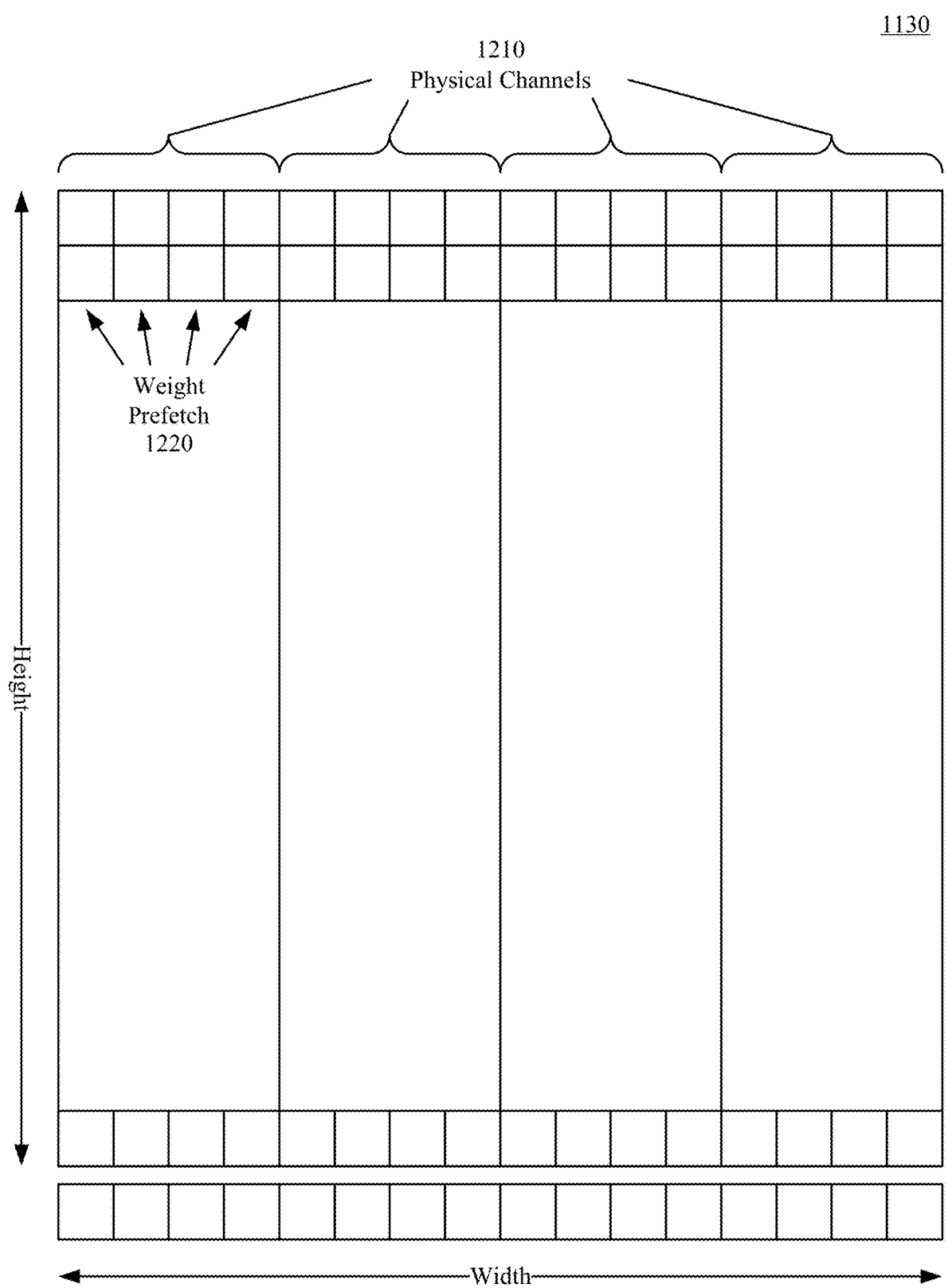
FIG. 12 shows a memory macro of a memory processing unit (MPU), in accordance with aspects of the present technology.

Referring to FIG. 12, a memory macro of a memory processing unit (MPU), in accordance with aspects of the present technology, is shown. The memory macro 1130 appears as a large 2-dimensional memory array. The memory macro 1130 can be characterized by a height and a width. The width of the memory macro 1130 can be configured to provide a very wide word fetch. The width of the memory macro 1130 can be many words per read wide, which can be determined by a needed read bandwidth access for weight arrays. In an exemplary implementation, the access bandwidth of a memory macro 1130 can be up to 1024 bits. The height of the memory macro 1130 can be a 1-dimensional addressable space. The height of the memory macro 1130 can be determined by the total size of the memory macro 1130 divided by the width of the memory macro 1130. The memory macro 1130 can be logically split into a plurality of physical channels 1210. Each physical channel can be considered a "weight prefetch" wide 1220.

Storage of weight arrays in the memory macros 1130-1165, in accordance with aspects of the present technology, can be configured to improve the performance of the memory processing unit (MPU) 100. One or more memory macros 1130-1160 can be configured to store all the weights needed for access by the compute cores 1115-1125 of a given group 1110. The one or more memory macros 1130-1160 can be configured to provide enough memory access bandwidth for the compute cores 1115-1125 in a given group 1110. The memory macros 1130-1165 can be optimized for read access by the compute cores 111-1125. The number of internal memory banks, arrangement and the like of the memory 1105 can be transparent to the architectural design of the memory processing unit (MPU).

Referring again to FIGS. 8-10, the weight arrays can be organized for storage in memory macros 1130-1160 to improve performance of a memory processing unit (MPU). The arrangement of weight arrays can impact data throughput, memory utilization, data reuse, memory access pattern, and mapping. Aspects of the present technology can fit a 4-dimension weight array into a 2-dimension memory macro. Aspects of the present technology can also expand 3-dimension and 2-dimension arrays to look like 4-dimension arrays for storage in 2-dimension memory macros.

Figure 13:
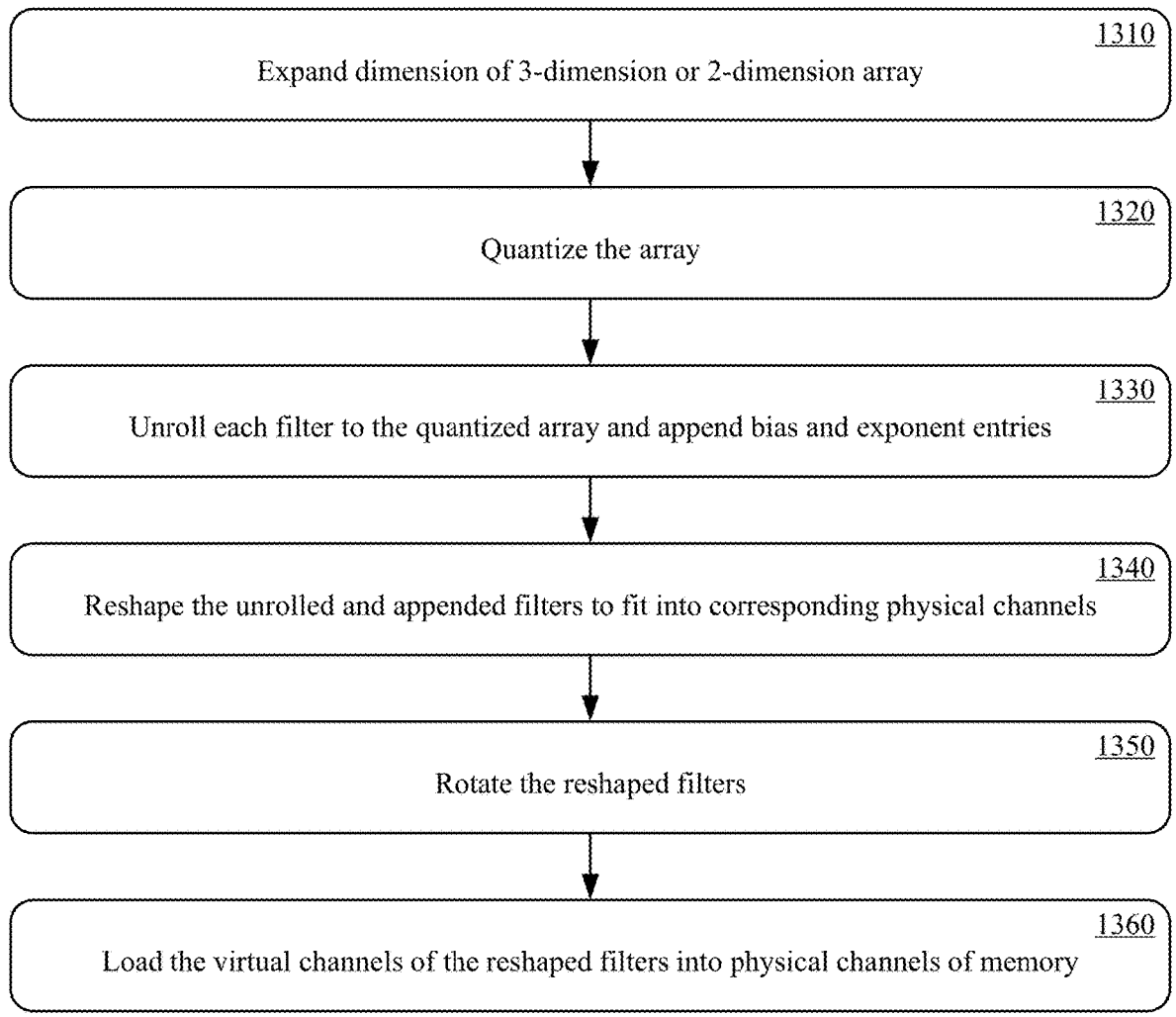
FIG. 13 shows a method of fitting arrays into a 2-dimension memory, in accordance with aspects of the present technology.
Figure 14:
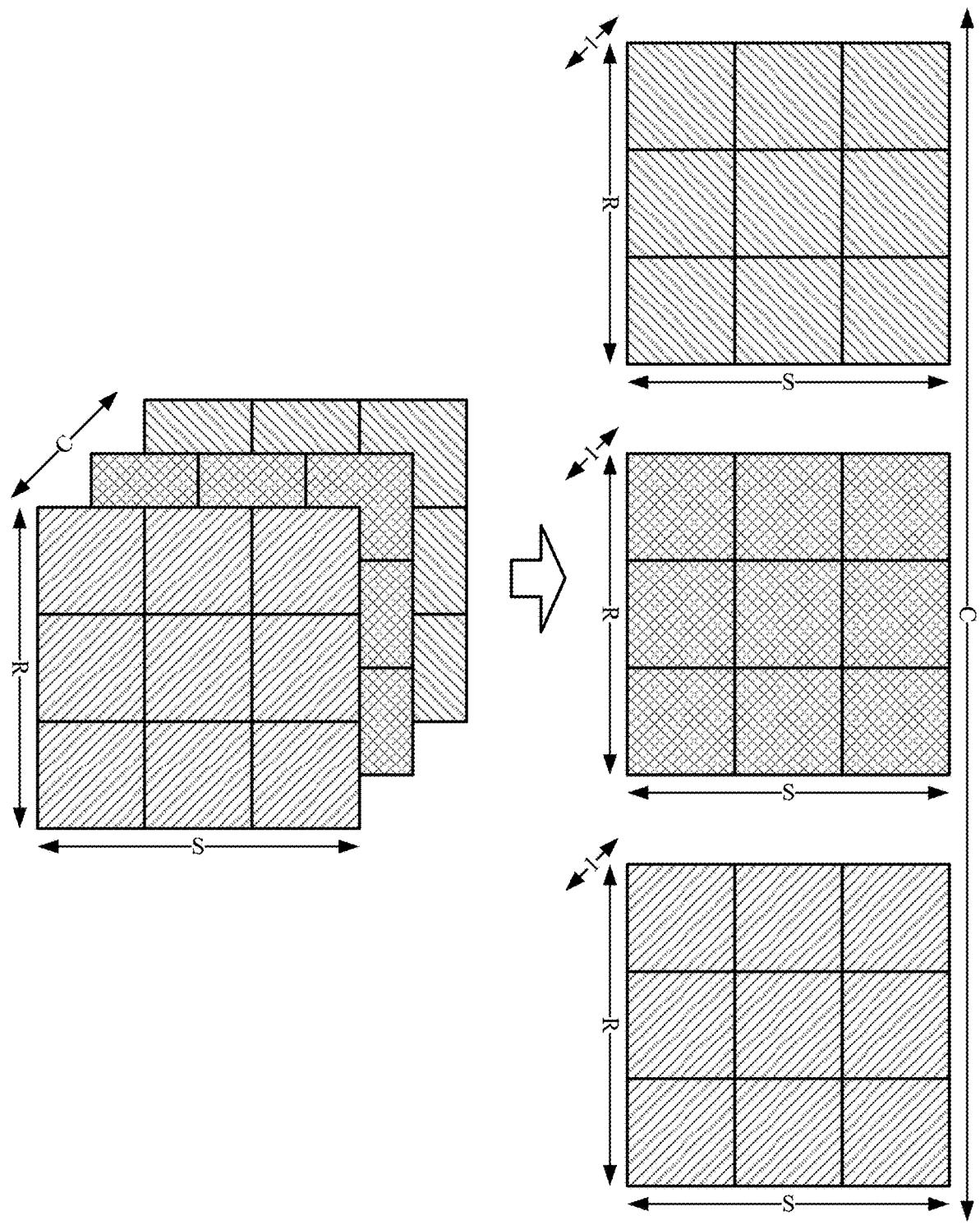
FIG. 14 illustrates expansion of a 3-dimension array, in accordance with aspects of the present technology.
Figure 15:
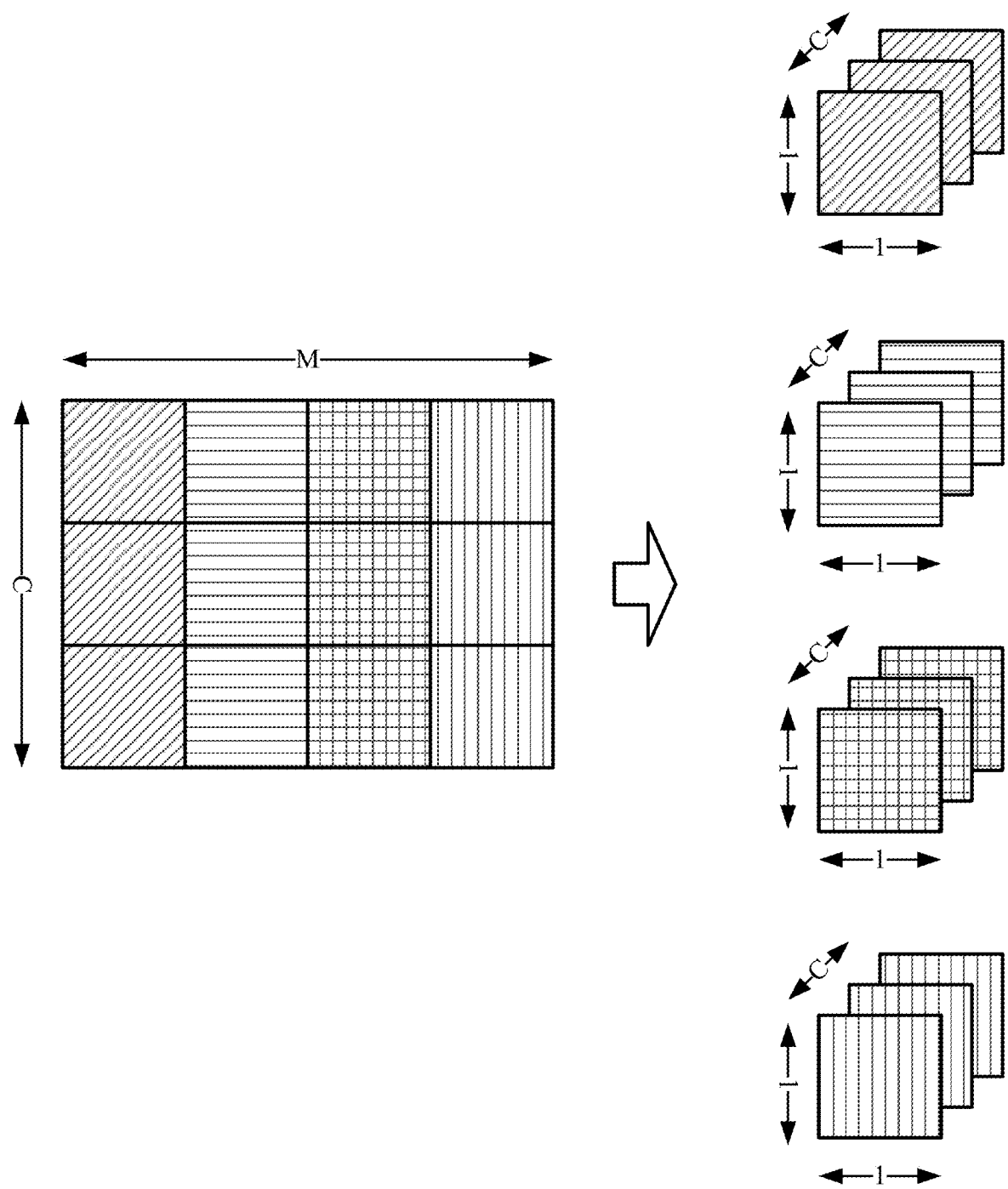
FIG. 15 illustrates expansion of a 2-dimension array, in accordance with aspects of the present technology.

Referring now to FIG. 13, a method of fitting arrays into a 2-dimension memory, in accordance with aspects of the present technology, is shown. In one implementation the array can be a 4-dimension, 3-dimension or 2-dimension weight array and the 2-dimension memory can be a memory macro. The method of fitting the array into a 2-dimension memory will be explained with reference to FIGS. 14-20. The method can include expanding the dimension of a 3-dimension or a 2-dimension array, at 1310. If the array is a 3-dimension array of kernel width (S), a kernel height (R) and input channels (C), the array can be expanded to a 4-dimension array of kernel width (S), a kernel height (R), one input channel and output channels (C), as illustrated in FIG. 14. If the array is a 2-dimension array of input channels (C) and output channels (M), the array can be expanded to a 4-dimension array of a single kernel width, a single kernel height, input channels (C) and output channels (M), as illustrated in FIG. 15.

Figure 16:
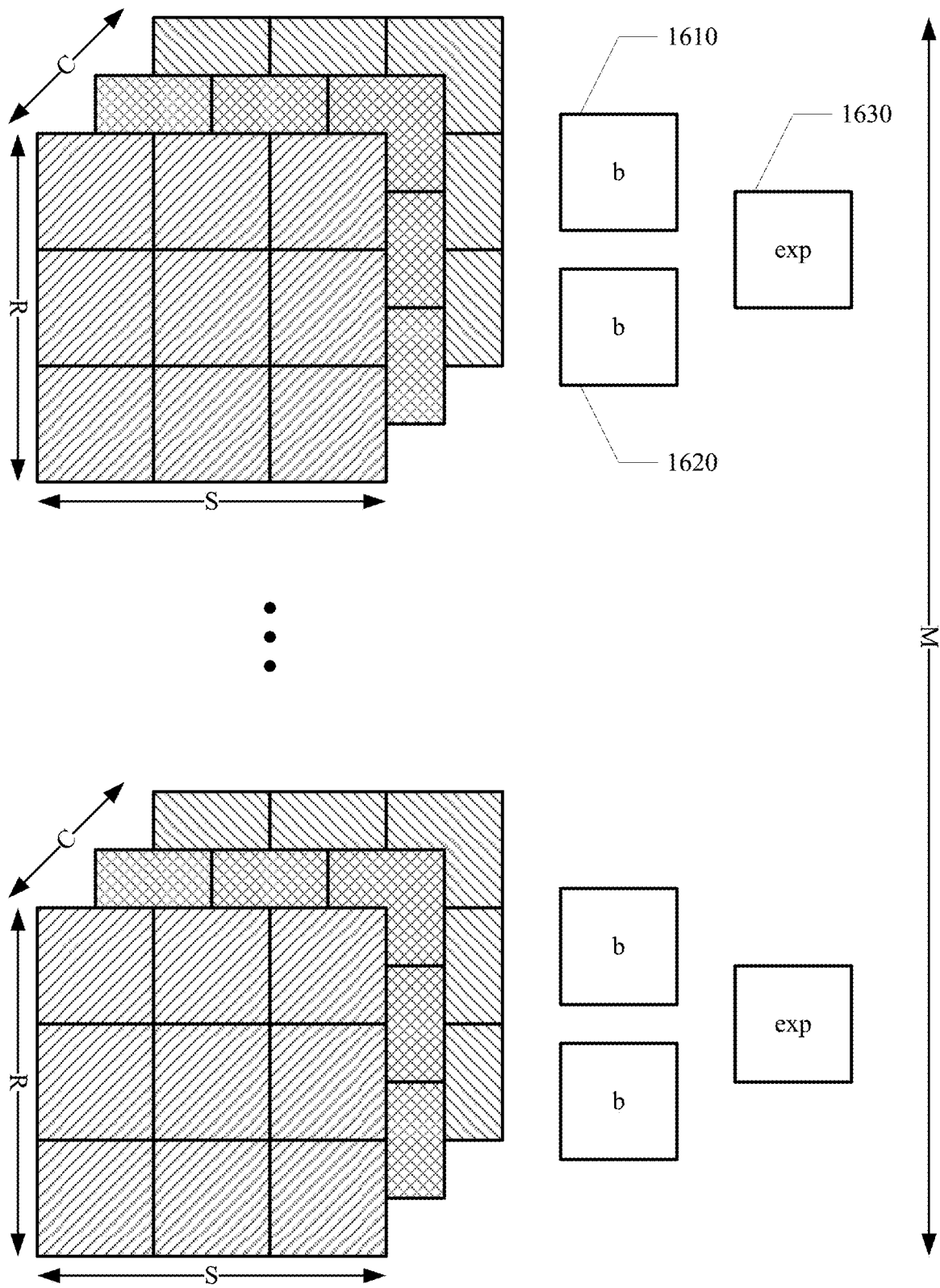
FIG. 16 illustrates quantization of an array, in accordance with aspects of the present technology.

At 1320, the 4-dimension array, expanded 3-dimension array or expanded 2-dimension array can be quantized, as illustrated in FIG. 16. Each array element can be quantized to an 8-bit value. Each filter can also include a single bias value (b) 1610, 1620 and one scaling exponent (exp) 1630. The single bias value 1610, 1620 can comprise two element entries. In one implementation, the single bias value 1610, 1620 can be encoded as a BFloat16 value.

Figure 17:
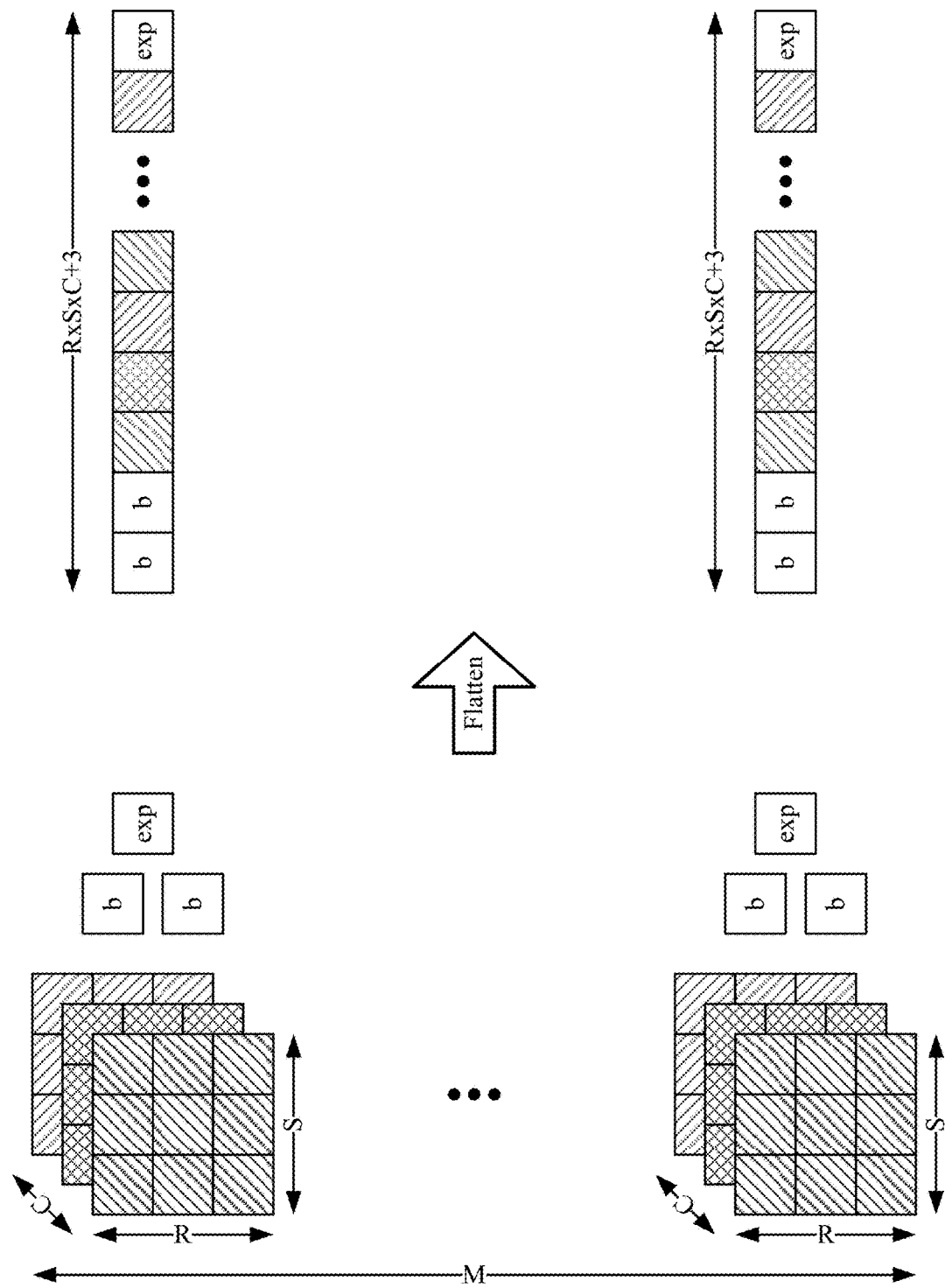
FIG. 17 illustrates flattening of a quantized array, in accordance with aspects of the present technology.

At 1330, the filters of the quantized array can be unrolled and the bias value and scaling exponent can be appended, as illustrate in FIG. 17. In one implementation, corresponding entries from each channel can be sequentially arranged after the bias value 1610, 1620, and the scaling exponent can be added at the end to produce M flattened output channels. The M flattened output channels can be characterized by length R×S×C+3. Each M flattened output channel corresponds to a virtual channel characterized by a virtual channel height (vch) of R×S×C+3.

Figure 18:
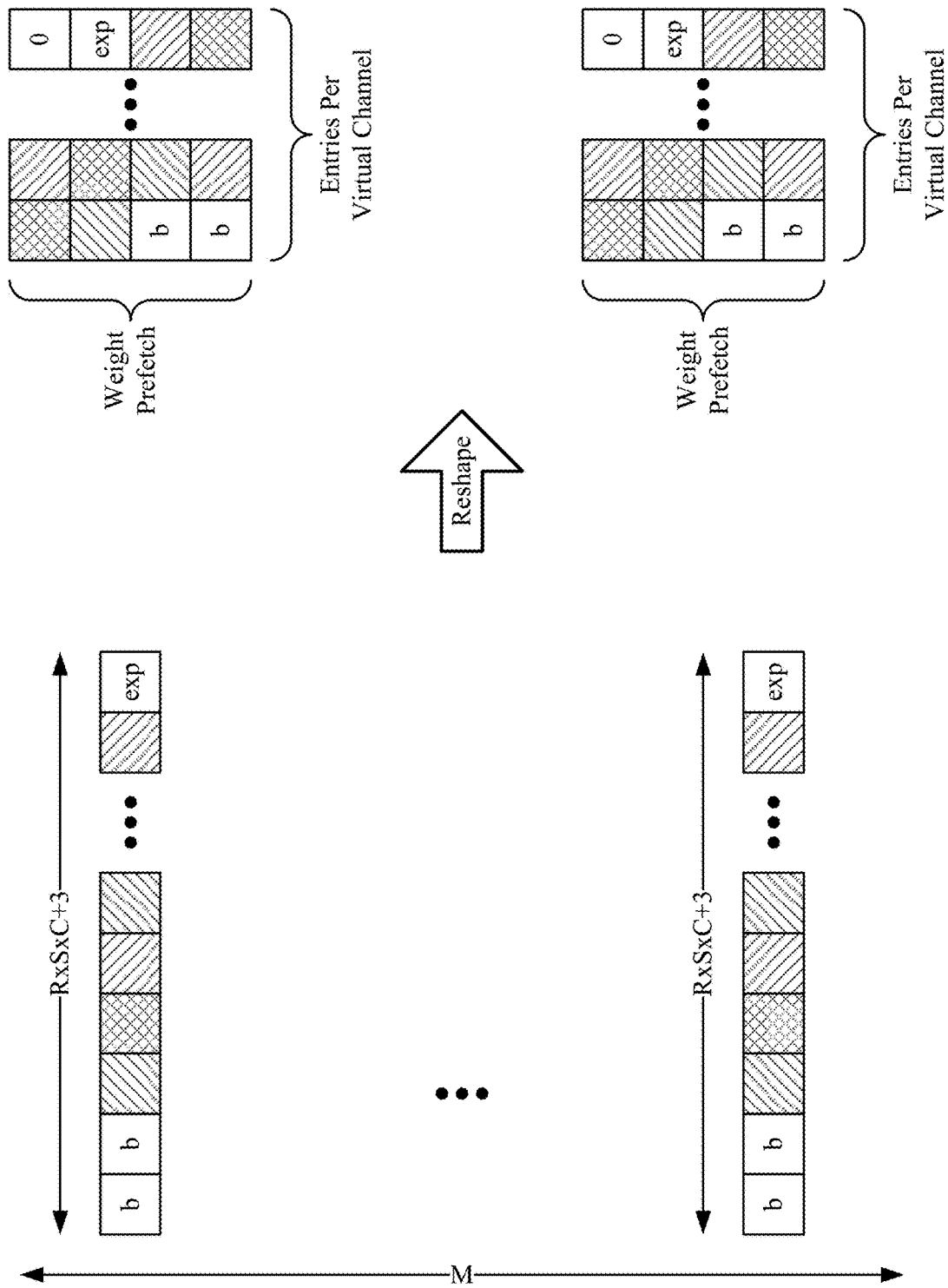
FIG. 18 illustrates reshaping of a flattened array, in accordance with aspects of the present technology.

At 1340, the unrolled and appended filters can be reshaped to fit into a physical channel of a memory, as illustrated in FIG. 18. The reshaped filters can be characterized by a weight prefetch height and an entries per virtual channel width. The reshaped filters can be padded with zero element values if necessary to fit the physical channel of the memory. In one implementation, the physical channel of the memory can be the physical channel of a memory macro 1130-1165.

Figure 19:
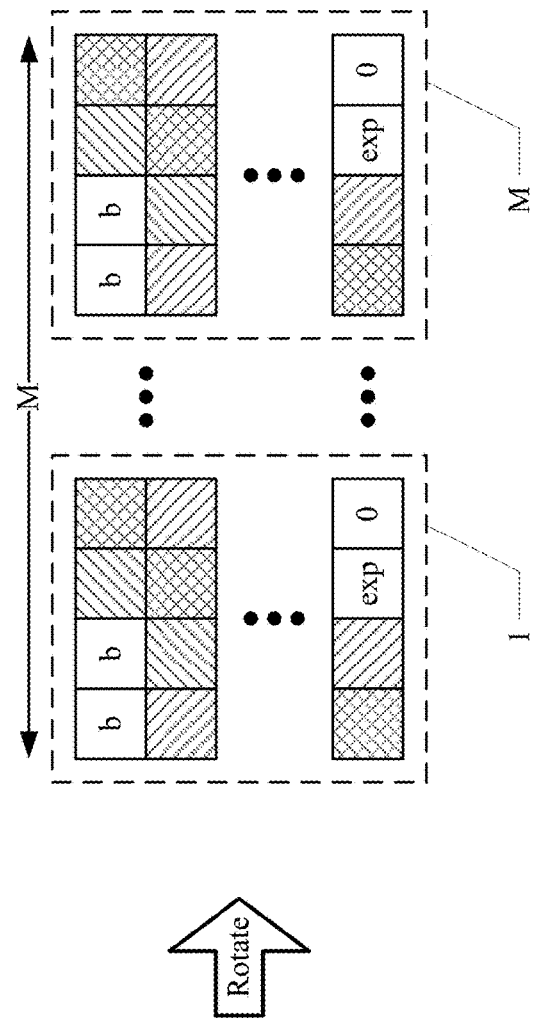
FIG. 19 illustrates rotating of a reshaped array, in accordance with aspects of the present technology.
Figure 19:
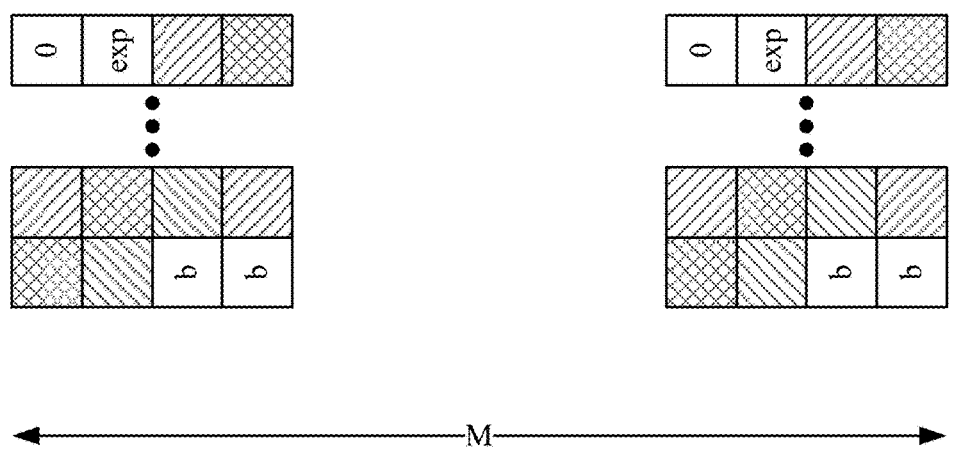
Figure 20:
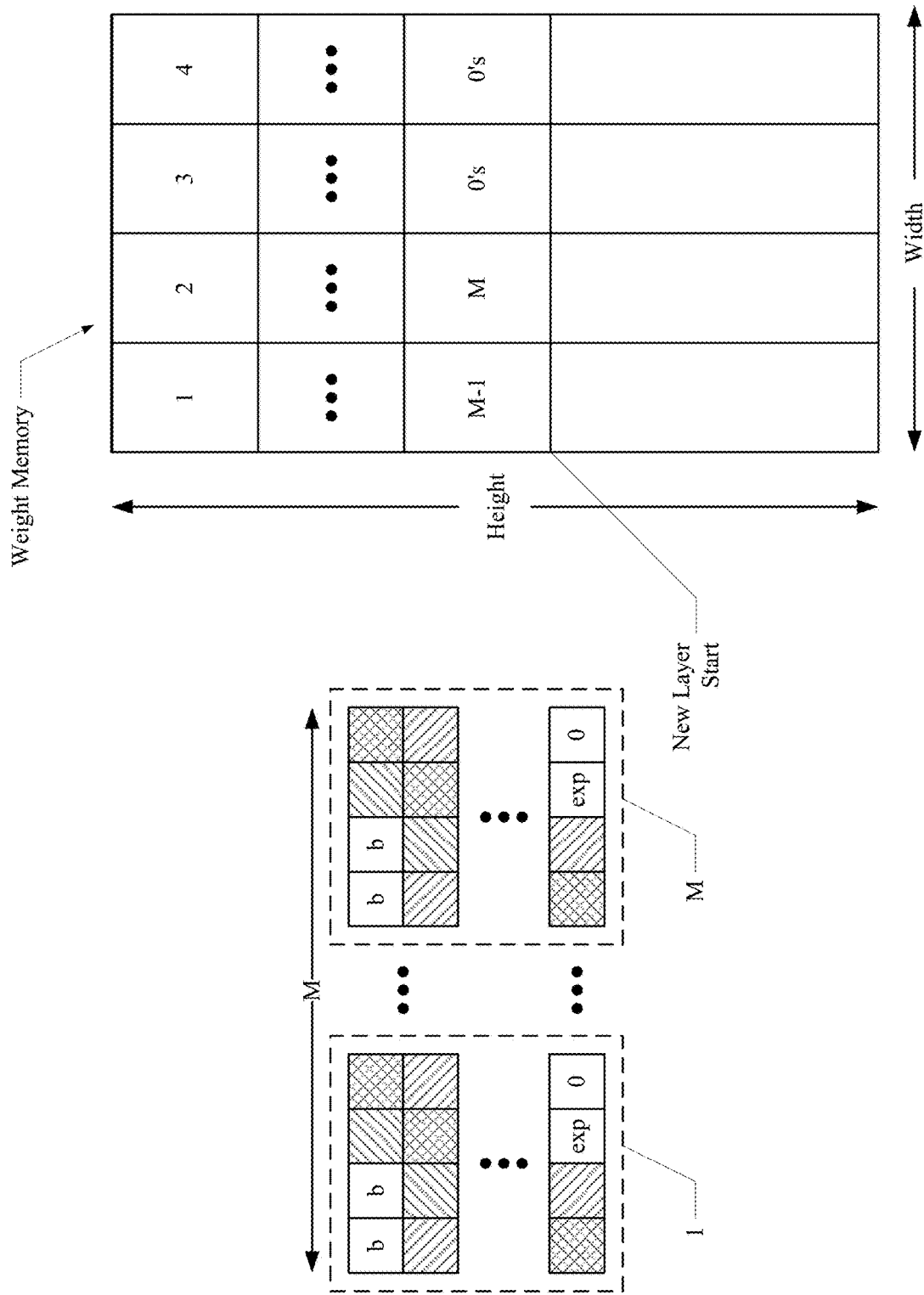
FIG. 20 illustrates loading virtual channels of the reshaped array into physical channels of memory.

At 1350, the reshaped filters can be rotated, as illustrated in FIG. 19. The rotated filters can comprise M virtual channels (e.g., output filters). At 1360, virtual channels of the rotated filters can be packed physical channels of the memory, as illustrated in FIG. 20. The M virtual channels of the rotated filters can be sequentially stored in the plurality of physical channels of the memory. Physical channels of the memory can be padded with zero (0) values if necessary, such that a weight array for a new layer starts at a first physical channel boundary of the memory.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A memory processing unit (MPU) comprising:
    a first memory including a plurality of regions;
    a plurality of processing regions interleaved between the plurality of regions of the first memory, wherein the processing regions include a plurality of compute cores configurable in one or more clusters, wherein the plurality of compute cores of respective ones of the plurality of processing regions are coupled between adjacent ones of the plurality of regions of the first memory, and wherein the plurality of compute cores of respective ones of the plurality of processing regions are configurably couplable in series; and
    a second memory coupled to the plurality of processing regions, wherein the second memory comprises a plurality of memory macros and wherein organization and storage of a weight array in a given one of the plurality of memory macros comprises:
    quantizing the weight array;
    unrolling each filter of the quantized weight array and append bias and exponent entries;
    reshaping the unrolled and appended filters to fit into corresponding physical channels;
    rotating the reshaped unrolled and appended filters; and
    loading virtual channels of the rotated reshaped unrolled and appended filters into physical channels of the given one of the memory macros.

2. The MPU of claim 1, wherein the first memory comprises an activation memory.

3. The MPU of claim 1, wherein the plurality of cores of respective ones of the plurality of processing regions includes one or more cores selected from a group consisting of a plurality of near memory (M) cores, one or more arithmetic (A) cores and one or more input/output (I/O) cores.

4. A method of fitting an array in a memory of a memory processing unit (MPU) comprising:
    quantizing the array;
    unrolling each filter of the quantized array and append bias and exponent entries;
    reshaping the unrolled and appended filters to fit into corresponding physical channels;
    rotating the reshaped unrolled and appended filters; and
    loading virtual channels of the rotated reshaped unrolled and appended filters into physical channels of the memory.

5. The method of fitting an array in a memory according to claim 4, further comprising:
    expanding dimension of a 3-dimension array prior to quantizing the array.

6. The method of fitting an array in a memory according to claim 4, further comprising:
    expanding dimension of a 2-dimension array prior to quantizing the array.

* * * * *